(12) United States Patent
Riguer

(10) Patent No.: US 11,474,591 B2
(45) Date of Patent: Oct. 18, 2022

(54) FINE-GRAIN GPU POWER MANAGEMENT AND SCHEDULING FOR VIRTUAL REALITY APPLICATIONS

(71) Applicant: ATI Technologies ULC, Markham (CA)

(72) Inventor: Guennadi Riguer, Thornhill (CA)

(73) Assignee: ATI Technologies ULC, Markham (CA)

( * ) Notice: Subject to any disclaimer, the term of this patent is extended or adjusted under 35 U.S.C. 154(b) by 233 days.

(21) Appl. No.: 15/229,932

(22) Filed: Aug. 5, 2016

(65) Prior Publication Data

US 2018/0039317 A1    Feb. 8, 2018

(51) Int. Cl.
*G06F 1/329* (2019.01)
*G06F 1/3234* (2019.01)
(Continued)

(52) U.S. Cl.
CPC ......... *G06F 1/329* (2013.01); *G02B 27/0101* (2013.01); *G06F 1/163* (2013.01); *G06F 1/3206* (2013.01); *G06F 1/3243* (2013.01); *G06F 3/011* (2013.01); *G06F 3/14* (2013.01); *G09G 5/363* (2013.01); *G02B 2027/014* (2013.01); *G02B 2027/0134* (2013.01); *G02B 2027/0141* (2013.01); *G09G 5/18* (2013.01); *G09G 2330/021* (2013.01); *G09G 2360/06* (2013.01); *G09G 2360/08* (2013.01); *Y02D 10/00* (2018.01)

(58) Field of Classification Search
None
See application file for complete search history.

(56) References Cited

U.S. PATENT DOCUMENTS 6,418,459 B1    7/2002  Gulick
6,760,852 B1    7/2004  Gulick
(Continued)

OTHER PUBLICATIONS

Kanter, David. "Graphics processing requirements for enabling immersive vr." AMD White Paper (2015).*
(Continued)

*Primary Examiner* — Ryan Mcculley
(74) *Attorney, Agent, or Firm* — Kowert Hood Munyon Rankin and Goetzel PC; Rory D. Rankin

(57) ABSTRACT

Systems, apparatuses, and methods for implementing fine-grain power management for virtual reality (VR) systems are disclosed. A VR compositor monitors workload tasks while rendering and displaying content of a VR application. The VR compositor determines the priorities of different tasks of a given VR frame and cause power states to be assigned to processing units to match the priorities of the tasks being performed. For example, if a first task within a first frame period is assigned a high priority, a processing unit executing the task operates at a relatively high power performance state when performing the first task. If a second task within the first frame period is assigned a low priority, the processing unit operates at a relatively low power performance state when performing the second task. By implementing fine-grain power management in a VR environment, the likelihood of the processing unit suffering a thermal event or impaired performance is reduced.

20 Claims, 12 Drawing Sheets

(51) Int. Cl.
*G06F 1/3206* (2019.01)
*G06F 3/01* (2006.01)
*G09G 5/36* (2006.01)
*G06F 3/14* (2006.01)
*G06F 1/16* (2006.01)
*G02B 27/01* (2006.01)
*G09G 5/18* (2006.01)

(56) References Cited

U.S. PATENT DOCUMENTS

| | | | |
|---|---|---|---|
| 6,826,704 B1 | 11/2004 | Pickett | |
| 7,849,332 B1* | 12/2010 | Alben | G06F 1/206 |
| | | | 713/300 |
| 7,882,369 B1* | 2/2011 | Kelleher | G06F 1/3203 |
| | | | 713/300 |
| 8,924,752 B1* | 12/2014 | Law | G06F 1/3206 |
| | | | 713/322 |
| 2013/0083042 A1* | 4/2013 | Sagall | G06T 1/20 |
| | | | 345/503 |
| 2013/0241942 A1* | 9/2013 | Bennett | G06F 3/14 |
| | | | 345/520 |
| 2014/0375658 A1 | 12/2014 | Lichmanov et al. | |
| 2015/0000889 A1* | 1/2015 | Bellamkonda | G01K 7/42 |
| | | | 165/287 |
| 2015/0134988 A1* | 5/2015 | Wang | G06F 1/206 |
| | | | 713/322 |
| 2015/0348226 A1* | 12/2015 | Vaishampayan | G06F 1/206 |
| | | | 345/503 |
| 2016/0018869 A1* | 1/2016 | Raghavan | G06F 1/3228 |
| | | | 713/320 |
| 2016/0048363 A1* | 2/2016 | North | G06F 1/1616 |
| | | | 345/1.1 |
| 2016/0378168 A1 | 12/2016 | Branover et al. | |
| 2017/0061568 A1* | 3/2017 | Metz | G06T 1/20 |
| 2017/0262030 A1* | 9/2017 | Lee | G06F 1/26 |
| 2017/0371719 A1* | 12/2017 | Majumdar | G06F 1/3228 |

OTHER PUBLICATIONS

Anthes, Christoph, et al. "State of the art of virtual reality technology." Aerospace Conference, 2016 IEEE. IEEE, 2016.*

Majumdar, et al., U.S. Appl. No. 15/192,784, entitled "Temperature-Aware Task Scheduling and Proactive Power Management", filed Jun. 24, 2016, 35 pages.

* cited by examiner

FINE-GRAIN GPU POWER MANAGEMENT AND SCHEDULING FOR VIRTUAL REALITY APPLICATIONS

BACKGROUND

Description of the Related Art

A convincing virtual reality (VR) experience has been a goal within the computing community for decades. Generally speaking, "virtual reality" refers to an artificial environment generated by computing technology. Through the use of display devices and user input devices such as motion detection devices, the presence and interaction of a user within the artificial environment is simulated. For example, a typical VR implementation includes a head mounted display (HMD), processing hardware (e.g., one or more graphical processing units), drivers, a VR compositor, and a VR application, and suitable audio. However, VR applications present unique challenges for the computing hardware and software that are tasked with creating a convincing experience.

In a VR environment, the requirement to control generated image frame latencies and a desire to avoid missed frames places special demands on GPU power management. On one hand, it is desirable to run at the highest clock rate possible to minimize the latency and guarantee the rendering of images finishes on time. However, on the other hand, if the GPU begins to overheat or nears a thermal threshold, the GPU reduces its clock rate which then results in missed frames. These issues are particularly challenging for power or thermally constrained platforms.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
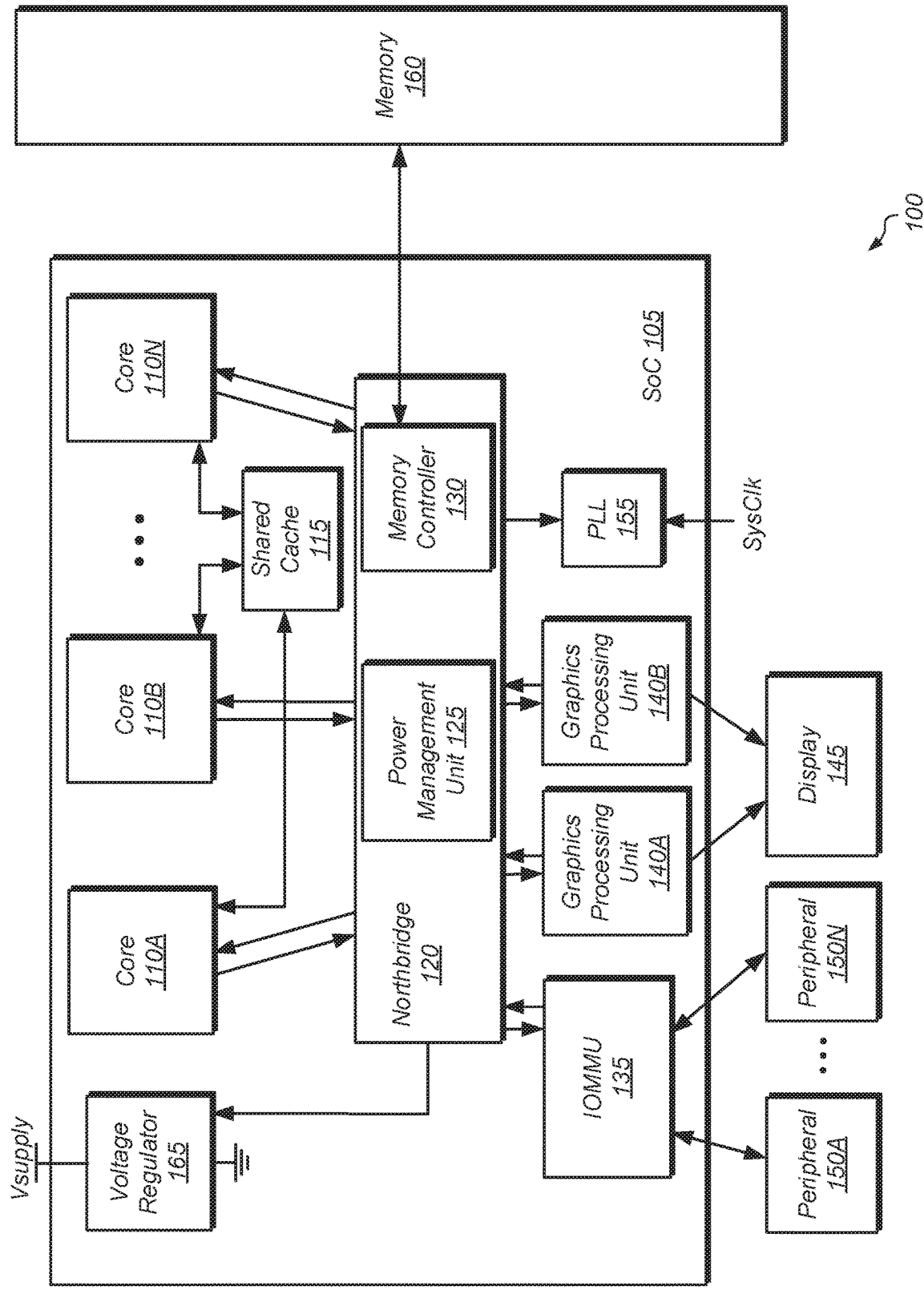
FIG. 1 is a block diagram of one embodiment of a computing system.

Systems, apparatuses, and methods for performing fine-grain power management in a virtual reality (VR) environment are contemplated. In various embodiments, a VR system includes at least a VR application, VR compositor, processing hardware, and a driver. In one embodiment, the processing hardware includes one or more graphical processing units (GPUs). In one embodiment, the VR compositor monitors workload tasks while content from the VR application is rendered and displayed on a head-mounted display (HMD). The VR compositor also determines the priority of each given task of the rendering workload. The processing hardware is then assigned a power performance state according to the priority of the given task while the processing hardware performs the given task. Generally speaking, the power performance state reflects the speed at which tasks are performed by the system. By adjusting power levels, frequency settings, resource allocation, and otherwise, the overall performance of the system is affected.

In another embodiment, the VR system sets the processing hardware to operate at a maximum (or any other fixed level) performance level for a specified number of frames. The VR system then monitors the timing of events during the specified number of frames. The events include the durations of various tasks being performed during the rendering of VR content. The VR system will feedback the timing into a control system for fine-grain power management. The VR system also determines the latency requirement of each rendering task within the VR workload and monitors the power and thermal states of the processing hardware. Then, the VR system dynamically adjusts performance of the processing hardware based on the observed timings, latency requirements, and power/thermal state of the processing hardware.

In a further embodiment, the VR application and/or compositor specifies non-overlapping intervals within a VR frame period. In one embodiment, the intervals correspond to separate tasks being performed by the processing hardware. The VR application and/or compositor determines a performance requirement for each interval of the VR frame period. Then, the driver maps the performance requirement to a power state of the VR processing hardware. Additionally, the driver conveys to the VR application and/or compositor a scale value that corresponds to an expected performance of the processing hardware. The VR application and/or compositor utilizes the returned scale value in a feedback control loop to dynamically adjust performance to expected levels and to control the performance/power ratio.

These and other features and advantages will become apparent to those of ordinary skill in the art in view of the following detailed descriptions of the approaches presented herein.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

FIG. 1 is a block diagram of a computing system 100, in accordance with some embodiments. In these embodiments, computing system 100 includes system on chip (SoC) 105 coupled to memory 160. SoC 105 is also referred to as an integrated circuit (IC). In some embodiments, SoC 105 includes a plurality of processor cores 110A-N. In other embodiments, SoC 105 includes a single processor core 110. In multi-core embodiments, processor cores 110 are identical to each other (i.e., symmetrical multi-core), or one or more cores are different from others (i.e., asymmetric multi-core). Each processor core 110 includes one or more execution units, cache memories, schedulers, branch prediction circuits, and so forth. Furthermore, each of processor cores 110 is configured to assert requests for access to memory 160, which functions as main memory for computing system 100. Such requests include read requests and/or write requests, and such requests are initially received from a respective processor core 110 by northbridge 120.

Input/output memory management unit (IOMMU) 135 is also coupled to northbridge 120 in the embodiment shown. IOMMU 135 functions as a south bridge device in computing system 100. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to IOMMU 135. Various types of peripheral devices 150A-N are coupled to some or all of the peripheral buses. Such peripheral devices include (but are not limited to) keyboards, mice, printers, scanners, joysticks or other types of game controllers, media recording devices, external storage devices, network interface cards, and so forth. One or more of the peripheral devices 150A-N coupled to IOMMU 135 via a corresponding peripheral bus assert memory access requests using direct memory access (DMA). These requests (which include read and write requests) are conveyed to northbridge 120 via IOMMU 135.

SoC 105 includes graphics processing units (GPUs) 140A-B that are coupled to display device 145 of computing system 100. GPUs 140A-B are representative of any number of GPUs. In other embodiments, SoC 105 includes a single GPU or three or more GPUs. In some embodiments, GPUs 140A-B are integrated circuits that are separate and distinct from SoC 105. Display device 145 is a head-mounted display (HMD), flat-panel LCD (liquid crystal display), plasma display, a light-emitting diode (LED) display, or any other suitable display type. GPUs 140A-B perform various video processing functions and provide the processed information to display 145 for output as visual information. GPUs 140A-B are also be configured to perform other types of tasks scheduled to GPUs 140A-B by an application scheduler.

In one embodiment, memory controller 130 is integrated into northbridge 120. In other embodiments, memory controller 130 is separate from northbridge 120. Memory controller 130 receives memory requests conveyed from northbridge 120. Data accessed from memory 160 responsive to a read request is conveyed by memory controller 130 to the requesting agent via northbridge 120. Responsive to a write request, memory controller 130 receives both the request and the data to be written from the requesting agent via northbridge 120. If multiple memory access requests are pending at a given time, memory controller 130 arbitrates between these requests.

In some embodiments, memory 160 includes a plurality of memory modules. Each of the memory modules includes one or more memory devices (e.g., memory chips) mounted thereon. In some embodiments, memory 160 includes one or more memory devices mounted on a motherboard or other carrier upon which SoC 105 is also mounted. In some embodiments, at least a portion of memory 160 is implemented on the die of SoC 105 itself. Embodiments having a combination of the aforementioned embodiments are also possible and contemplated. In one embodiment, memory 160 is used to implement a random access memory (RAM) for use with SoC 105 during operation. The RAM implemented is static RAM (SRAM) or dynamic RAM (DRAM). The type of DRAM used to implement memory 160 includes (but is not limited to) double data rate (DDR) DRAM, DDR2 DRAM, DDR3 DRAM, and so forth.

Although not explicitly shown in FIG. 1, in one embodiment, SoC 105 includes one or more cache memories that are internal to the processor cores 110. For example, each of the processor cores 110 includes an L1 data cache and an L1 instruction cache. In some embodiments, SoC 105 includes a shared cache 115 that is shared by the processor cores 110. In some embodiments, shared cache 115 is an L2 cache. In some embodiments, each of processor cores 110 has an L2 cache implemented therein, and thus shared cache 115 is an L3 cache. In one embodiment, cache 115 is part of a cache subsystem including a cache controller.

In one embodiment, power management unit 125 is integrated into northbridge 120. Power management unit 125 is configured to manage the power states of the various processing units of SoC 105. In one embodiment, power management unit 125 uses dynamic voltage and frequency scaling (DVFS) to change the frequency and/or voltage of a processing unit to limit the processing unit's power consumption to a chosen power allocation. In one embodiment, SoC 105 includes a phase-locked loop (PLL) unit 155 coupled to receive a system clock signal. PLL unit 155 includes a number of PLLs configured to generate and distribute corresponding clock signals to each of processor cores 110 and to other components of SoC 105. In the embodiment shown, SoC 105 also includes voltage regulator 165. Voltage regulator 165 provides a supply voltage to each of processor cores 110, GPUs 140A-B, and to other components of SoC 105. In some embodiments, voltage regulator 165 provides a supply voltage that is variable according to a particular operating point.

In various embodiments, computing system 100 is a computer, laptop, mobile device, server, web server, cloud computing server, storage system, or any of various other types of computing systems or devices. It is noted that the number of components of computing system 100 can vary from embodiment to embodiment. There can be more or fewer of each component/subcomponent than the number shown in FIG. 1. It is also noted that computing system 100 includes many other components not shown in FIG. 1.

Figure 2:
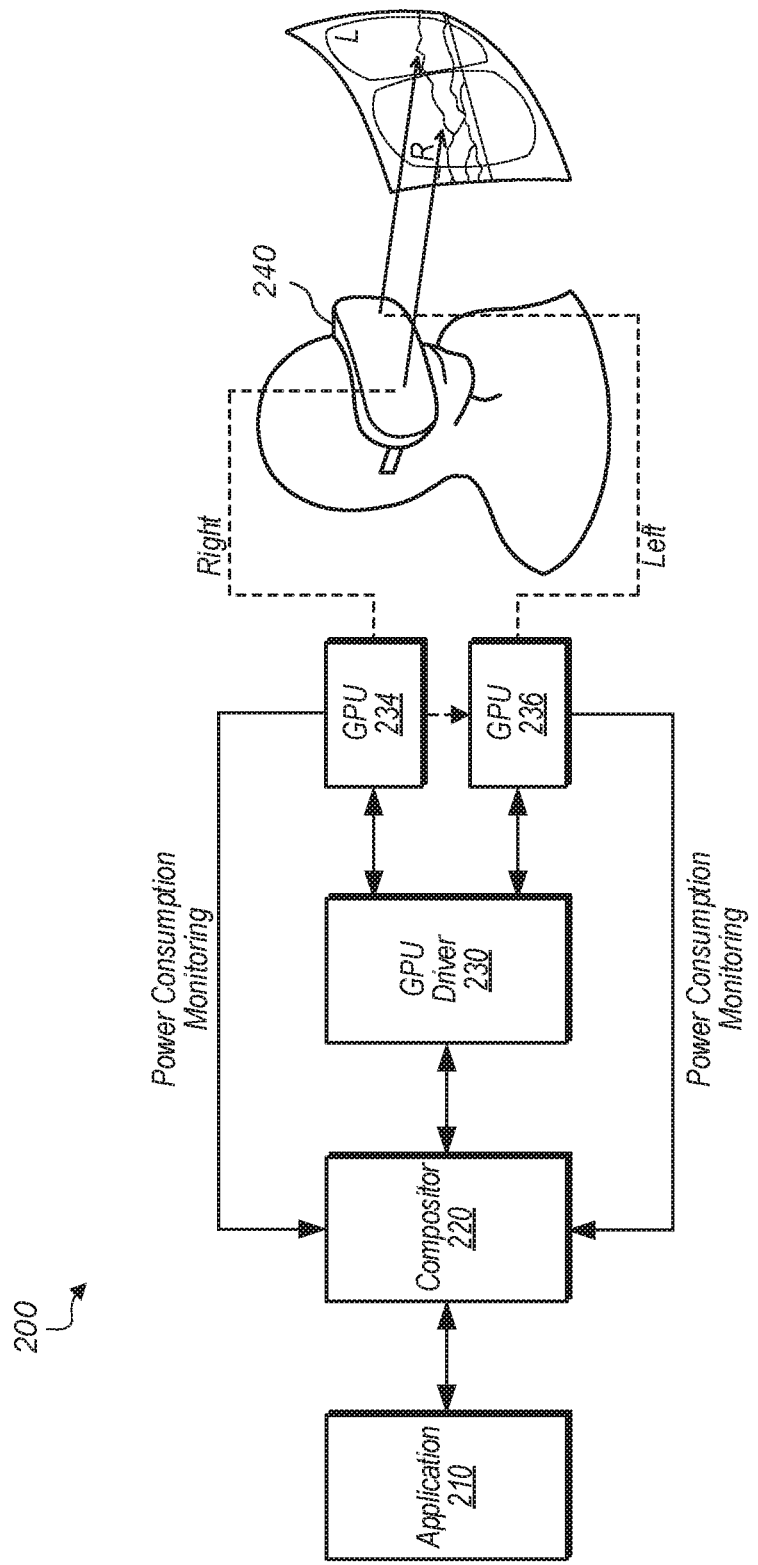
FIG. 2 is a block diagram of one embodiment of a system for use in a virtual reality (VR) environment.

Turning now to FIG. 2, a block diagram of one embodiment of a system 200 for use in a virtual reality (VR) environment is shown. For purposes of discussion, the term virtual reality will be used to cover a variety of computer generated environments—including those in which the environment is entirely computer generated and those in which the environment is only partially computer generated and combined with elements of a real environment (sometimes referred to as "augmented reality"). It is also noted that the methods and mechanisms described herein also apply to more traditional two dimensional computer generated environments depicted on a computer monitor. Such environments would include applications involving computer games, medical systems, educational systems, and numerous other possible applications.

In the example of FIG. 2, system 200 includes at least application 210, compositor 220, GPU driver 230, GPUs 234 and 236, and head mounted display (HMD) 240. It is noted that while FIG. 2 illustrates various components (210, 220, 230, 234, and 236) as distinct from HMD 240, in some embodiments one or more of these various components may be integrated as part of the HMD 240 itself. Similarly, one or more of the components described in FIG. 1 may be integrated as part of the HMD 240. In some embodiments, system 200 includes other numbers of GPUs. It is noted that in other embodiments, system 200 can include a single GPU or more than two GPUs while implementing the methods and mechanisms described herein. GPUs 234 and 236 are configured to execute instructions generated by application 210 and compositor 220 for rendering display content. Each of GPUs 234 and 236 have any number of compute units, depending on the embodiment.

In one embodiment, application 210 and compositor 220 communicate with an application programming interface (API) when generating rendering tasks to be executed on GPUs 234 and 236. The API allows application 210 and compositor 220 to output graphics data and commands in a standardized format rather than in a format that is specific to GPUs 234 and 236. In various embodiments, compositor 220 and other components shown in FIG. 1 and FIG. 2 comprises hardware (e.g., circuitry) and/or software operable to perform various functions described. These hardware and/or software components may also generally be referred to as "logic". The API communicates with GPU driver 230, and GPU driver 230 translates standard code received from the API into a native format of instructions understood by GPUs 234 and 236. GPUs 234 and 236 then executes the instructions received from GPU driver 230. In one embodiment, GPU 234 is responsible for generating pixel data for the right eye portion of HMD 240 and GPU 236 is responsible for generating pixel data for the left eye portion of HMD 240. In other embodiments, both of GPU 234 and 236 are assigned rendering tasks which correspond to the entirety of HMD 240.

In a VR environment, controlling frame latency to prevent missed frames places special demands on the power management of GPUs 234 and 236. On one hand, it is desirable to run GPUs 234 and 236 at the highest clock frequency possible to minimize the latency and guarantee the rendering finishes on time. On the other hand, it might be desirable to trade a bit of latency for lower performance so as to prevent GPUs 234 and 236 from overheating and drastically dropping the clock frequency in response to a critical thermal event that would cause prolonged periods of time of missed frames. This is particularly important for thermally constrained platforms (e.g., notebooks). In one embodiment, compositor 220 monitors the power consumption of GPUs 234 and 236 and utilizes the power consumption data to determine how to implement fine-grain power management techniques.

Static power profiles provide one possible mechanism for managing the power consumption of GPUs 234 and 236. A few pre-defined profiles target several workload types to cover some of the typical cases. Using power profiles, application 210 could indicate to compositor 220 that VR content is being rendered, requesting VR-friendly power behavior. For example, GPU driver 230 generates high clock frequencies for parts of a rendered frame when GPUs 234 and/or 236 are expected to be busy to ensure judder-free rendering. The term "judder" refers to a jerky movement within a scene as displayed on HMD 240 when the user turns their head from side to side and the motion interpolation cannot keep up. In some embodiments, the functionality of application 210 and compositor 220 are combined within a single software application. This combined software application can be referred to as an application or a compositor.

System 200 leverages knowledge of frame-to-frame coherence of distinct rendering tasks of VR workloads and utilizes knowledge of the compositor 220 scheduling and time keeping to implement fine-grain power management of GPUs 234 and 236. The frame-to-frame coherence is based on the timings of the workloads or based on other indicators (e.g., number of draw calls, number of processed vertices or pixels per frame). Application 210 has knowledge of what is being rendered based on the direction of the camera or based on a prediction that some event, like an explosion in a game, is about to happen. Compositor 220 utilizes these various inputs to determine how to dynamically adjust the power states of GPUs 234 and 236 within different portions of frame periods. For example, when GPUs 234 and 236 are performing rendering tasks with low priority, the power states of GPUs 234 and 236 are reduced. Also, when GPUs 234 and 236 are performing rendering tasks with high priority, the power states of GPUs 234 and 236 are increased. In some cases, the power states of GPUs 234 and 236 are adjusted multiple times within a single frame period of VR rendering.

Figure 3:
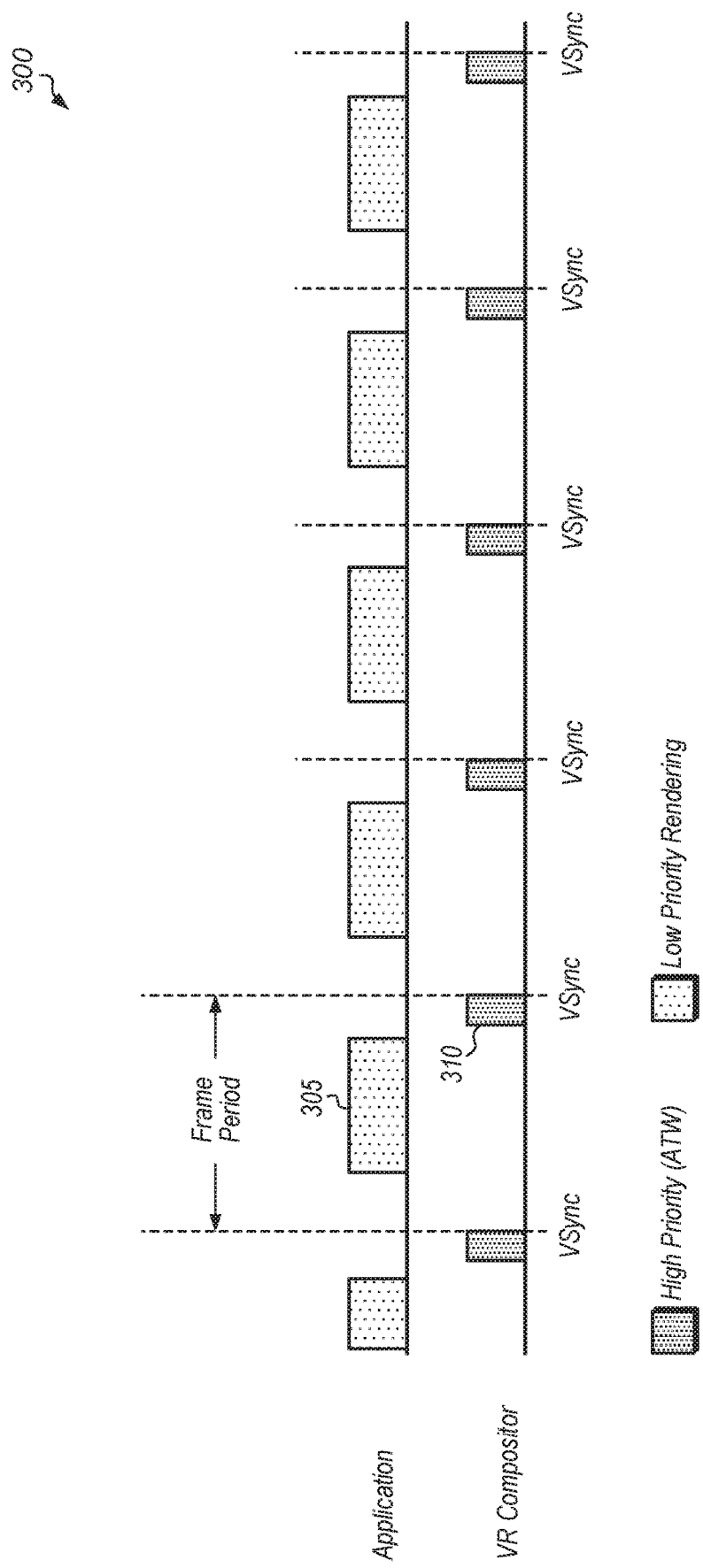
FIG. 3 illustrates a timing diagram of one embodiment of a VR application.

Referring now to FIG. 3, a timing diagram 300 of one embodiment of a VR application is shown. In one embodiment, fine-grain power management is utilized so as to achieve high performance in a thermally constrained system. In another embodiment, fine-grain power management is utilized to minimize power consumption on a mobile system that is power limited. In other embodiments, fine-grain power management is utilized to achieve other desired goals depending on the platform and current operating conditions.

Given a wide range of possible workload scenarios implemented by a combination of VR compositors and VR applications, fine-grain power management techniques are implemented to control the power states of processing hardware and determine tradeoffs with latency and quality-of-service for workloads. In one embodiment, the implementation of fine-grain power management is a collaborative effort between a VR compositor and a GPU driver. When rendering a given frame, there are distinct rendering tasks that have different latency, timing, and power requirements.

Timing diagram 300 illustrates one possible VR scenario where a VR compositor has a high-priority processing workload for the asynchronous time warp (ATW) and an application (e.g., game) has a low-priority rendering workload. During each VR frame period, different intervals within the VR frame period are assigned different priorities. The boundaries of each frame period are determined by the vertical synchronization (VSync) signals. In other words, the start of a frame period coincides with a VSync signal and the end of the frame period coincides with the next VSync signal. As used herein, the term "frame period" is defined as the reciprocal of the frame rate.

In one embodiment, the priorities assigned to intervals are translated into different power states for the processing hardware (e.g., GPU(s)) to perform the rendering tasks in these intervals. For example, a low priority rendering of an application is indicated in interval 305 in a given frame period of timing diagram 300. The rendering of the application is performed on the processing hardware with the hardware operating at a relatively low power state. Within the same frame period, the high priority rendering of the VR compositor in interval 310 is performed on the processing hardware with the hardware operating at a relatively high power state. In the case where a system includes multiple processing devices (e.g., GPUs), a compositor can consider power management at a system level and adjust timing of rendering tasks and power states across the processing devices to minimize the total instantaneous power consumption.

By implementing fine-grain power management, the VR compositor trades power and performance for various parts of the frame in response to the environment or platform requirements. The VR compositor monitors the GPU execution timeline within a rendered VR frame to minimize application latency and ensure the ATW is scheduled at a proper time. ATW is a technique that generates intermediate frames in situations when the application is unable to maintain the frame rate. By generating intermediate frames, judder is reduced. Combining knowledge of workload timing within a frame with quality of service and latency requirements and adjusting the performance/power tradeoff gives the VR system an opportunity to execute more efficiently.

A fine-grain power management strategy saves power on mobile platforms and prevents overheating on thermally constrained platforms. The VR compositor is aware of the platform constraints and applies different power management strategies to maximize the benefits on a particular platform. For example, different schemes could be applied on desktop and laptop systems.

Figure 4:
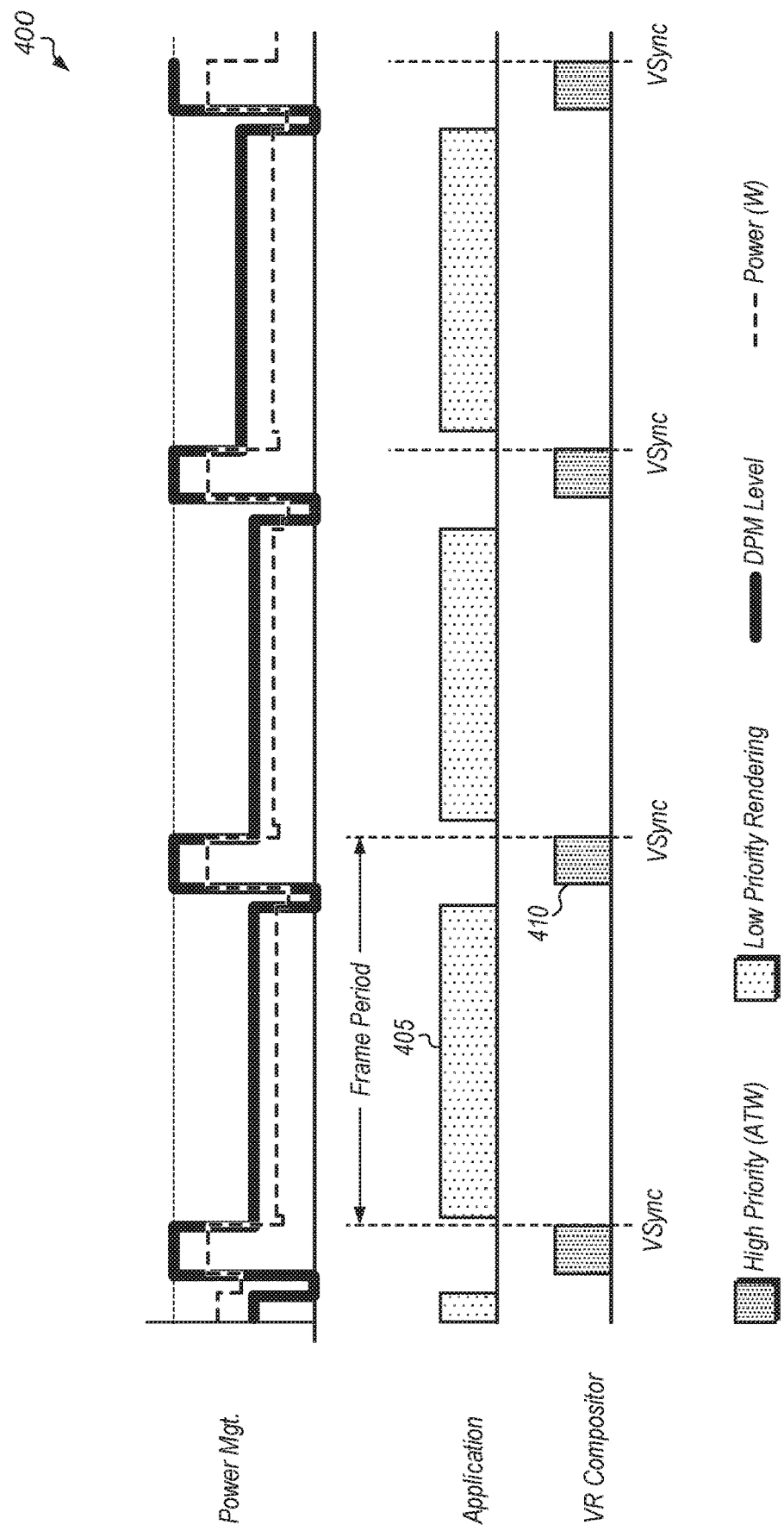
FIG. 4 illustrates a timing diagram of one embodiment of an implementation of fine-grain power management.

Turning now to FIG. 4, a timing diagram 400 of one embodiment of an implementation of fine-grain power management is shown. In one embodiment, power saving benefits are realized by sacrificing some frame latency and stretching out some of the frame rendering to take longer. For example, power saving benefits are realized if the GPU is run at a lower clock frequency and lower voltage for longer periods of time, rather than having high-clock, high-power bursty workloads. Also, part of the frame could have real-time requirements, such as ATW, which are run at a high clock frequency to meet stricter timing requirements.

One example of a fine-grain power management scheme is shown at the top of timing diagram 400, and the fine-grain power management scheme utilizes different power settings for different periods of time within a VR frame period. For example, while the application and VR compositor are idle, the power setting is at the lowest power setting for the GPU hardware. While the application content is being rendered in interval 405, the power setting is set to a medium power setting which is higher than the lowest power setting. The medium power setting results in stretched rendering for the application, resulting in lower power consumption by the GPU. Reducing the power setting and slowing down the GPU for parts of the frame that don't have real-time requirements reduces the effect of overheating on thermally constrained platforms by proactively avoiding thermal events.

While the VR compositor task is being rendered in interval 410, the power setting is set to the highest power setting which is higher than the medium power setting. This scheme is shown at the top of diagram 400 with the bold line representing the dynamic power management (DPM) setting for different portions of the frame. In between interval 405 and interval 410, the GPU hardware is set to the lowest possible power state. These power settings for the frame period including intervals 405 and 410 are repeated for additional frames.

In some embodiments, a fine-grain power management scheme identifies non-overlapping intervals within a frame period and then specifies performance requirements for the intervals. A frame is denoted by VSync and the timing of intervals is specified relative to Vsync. In one embodiment, the performance requirements are specified using a linear scale of the GPU performance relative to the highest and lowest power states. For example, a 0.5 performance value would be in the middle between maximum and minimum GPU power states. Internally, the GPU driver maps the performance requirement factor to one of the power states and returns to the application a scale value that is closest to the expected performance, based on the mapping of discrete power states back to the performance scale. For example, for a given rendering task an application could request a performance factor of 0.4, but the GPU driver indicates to the application that a factor of 0.55 will actually be applied to the GPU hardware. This returned value is used by the application in a feedback control loop to dynamically adjust performance to expected levels and to control performance/power ratio.

In one embodiment, a VR compositor starts with high performance for a few frames while measuring the timing and duration of rendering tasks. The VR compositor will then feedback the timing and duration of rendering tasks into the control system. Based on the observed timings, latency requirements, and a power/thermal state of the GPU, the control system in the VR compositor decides how to adjust performance. In various embodiments, the VR compositor chooses to minimize power or to maximize performance without causing thermal events. In another embodiment, some part of this control is extended by the VR compositor to the VR application to indicate that some portion of a rendered frame has some timing critical calculations (e.g., some compute job needs to be computed quickly if it causes some CPU/GPU serialization or otherwise has low latency requirements). It is noted that while the above discussion describes non-overlapping intervals, in some embodiments a plurality of tasks for rendering a given frame execute concurrently to render common areas of the given frame. For example, different tasks are configured to render different layers of a region of the frame or otherwise render different elements. In such embodiments, the above discussed determination(s) regarding timings, latency requirements, power/thermal state, and otherwise, to determine power performance states for the different tasks are applied as well.

While the rendering tasks of the methods and mechanisms presented herein are described as being performed on a GPU, it should be understood that this is indicative of one type of embodiment. In other embodiments, the rendering tasks are performed on other types of processors (e.g., CPUs, accelerated processing units (APUs), field programmable gate arrays (FPGAs), application specific integrated circuits (ASICs)).

Figure 5:
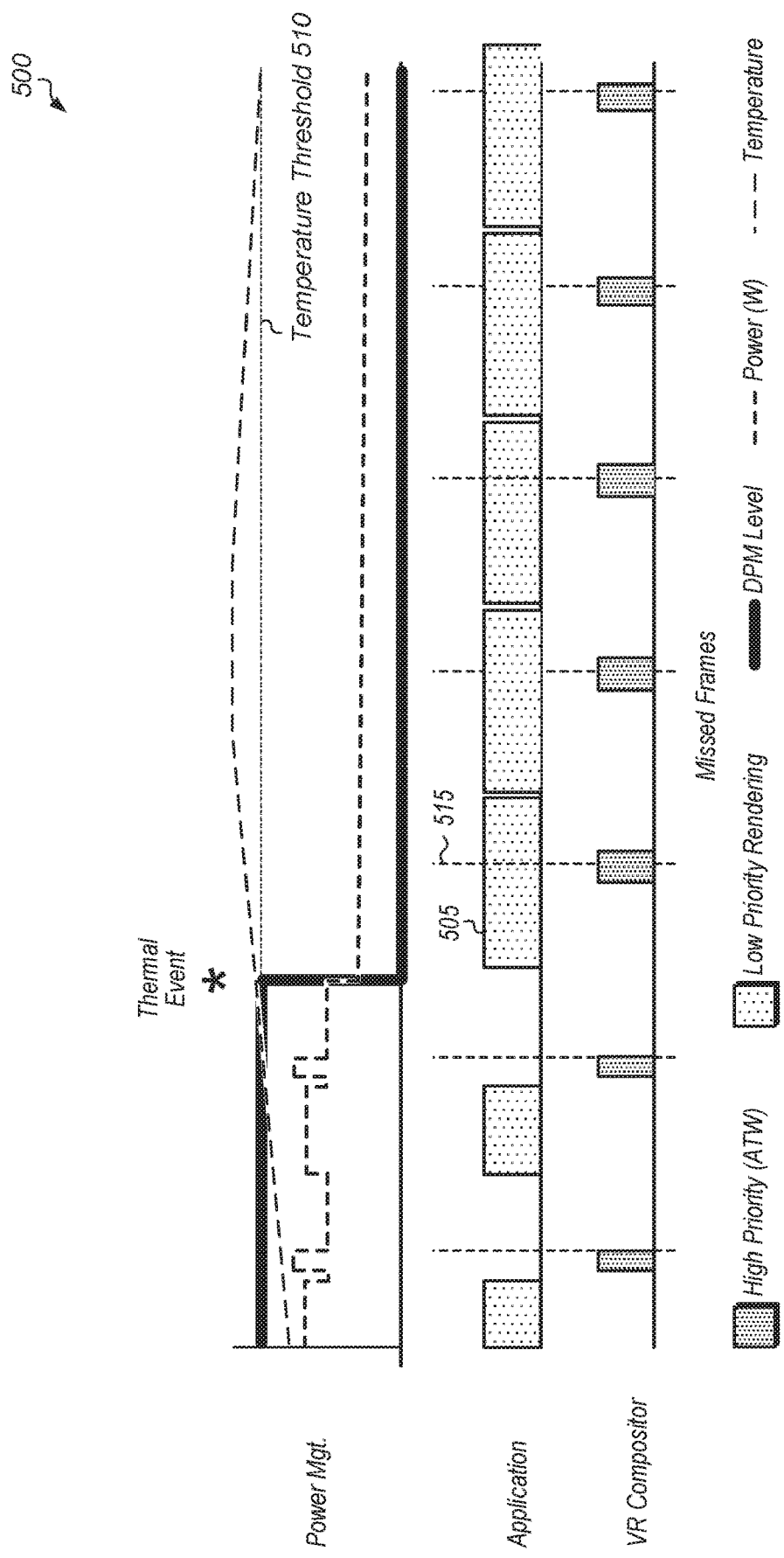
FIG. 5 illustrates a timing diagram of one embodiment of a VR application.

Referring now to FIG. 5, a timing diagram 500 of one embodiment of a VR application is shown. Timing diagram 500 illustrates the effects of the GPU reaching a thermal event during VR rendering. The thermal event is caused by the temperature of the GPU exceeding temperature threshold 510. When the GPU experiences a thermal event, the GPU responds by drastically dropping the clock frequency to cool the GPU, which generally results in periods of frame judder. This is illustrated with interval 505 which, due to the lower clock frequency, takes a longer amount of time to complete and stretches past Vsync 515, resulting in a missed frame. Subsequent intervals for the application being rendered also result in missed frames as the GPU continues to operate at the low clock frequency until the temperature falls below threshold 510.

Without utilizing fine-grain power management techniques, the GPU hardware has a higher tendency to suffer from thermal events. This will in turn cause more missed frames when rendering VR content, which will have a negative impact on the overall VR experience.

Figure 6:
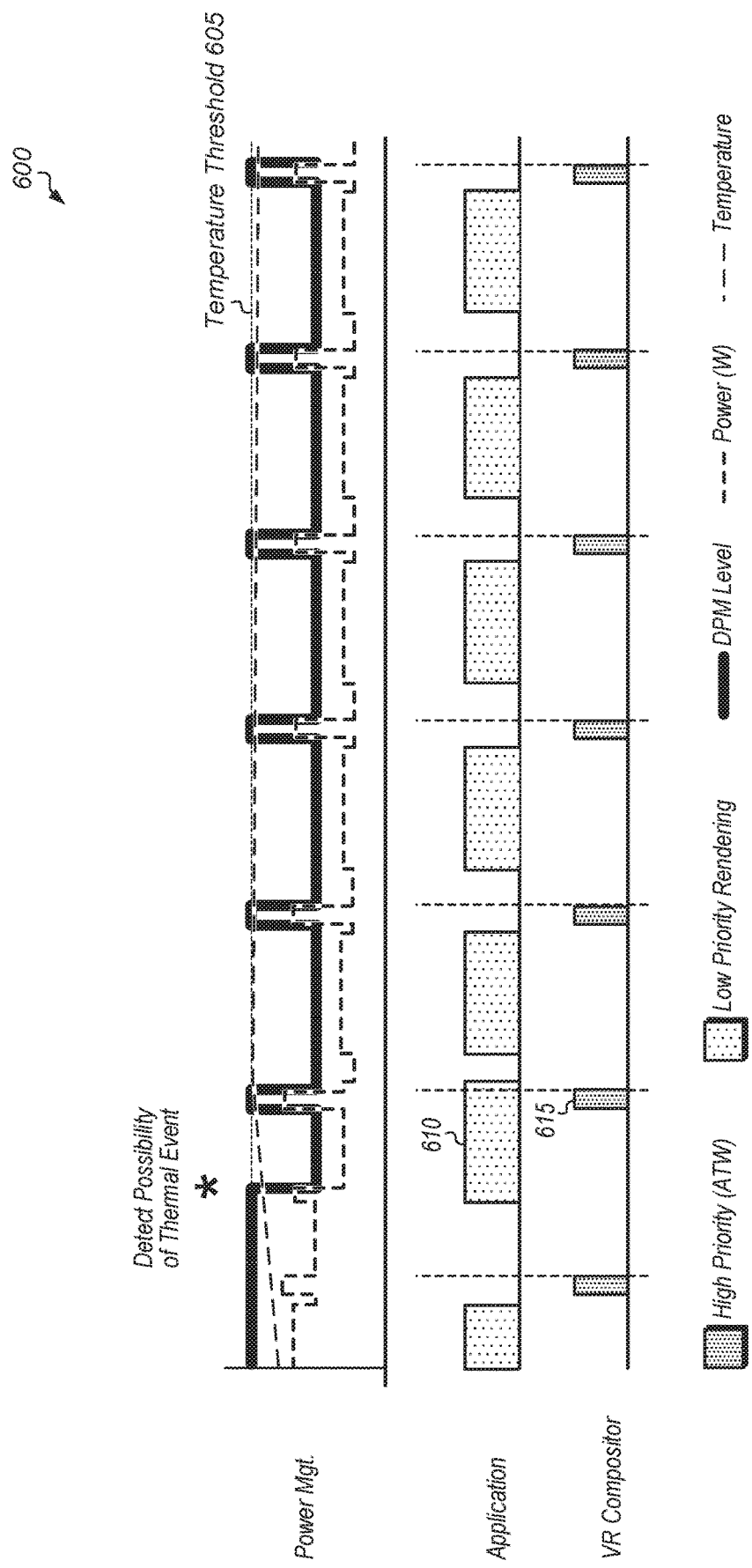
FIG. 6 illustrates a timing diagram of one embodiment of an implementation of fine-grain power management.

Turning now to FIG. 6, one embodiment of a timing diagram 600 of an implementation of fine-grain power management is shown. If a VR compositor is aware of an impending thermal event, the VR compositor lowers the power state of the GPU for non-real-time portions of the frame to avoid critical thermal events. Timing diagram 600 illustrates an example of such a scenario.

The VR compositor detects a possibility of an impending thermal event with the temperature of the GPU approaching temperature threshold 605. As a result of the VR compositor detecting the possibility of the thermal event, the power state of the GPU is lowered during the rendering interval 610 of the VR application. However, the VR compositor utilizes a fine-grain power management scheme which recognizes the higher priority of interval 615 and maintains or increases the power state of the GPU for the rendering of content in interval 615. This scheme of lowering the power state of the GPU for the low priority intervals and maintaining or increasing the power state of the GPU for the high priority intervals continues for the remainder of the frame periods shown in timing diagram 600. By lowering the power state of the GPU for the low priority intervals, the temperature of the GPU is overall decreased and a thermal event is avoided.

Figure 7:
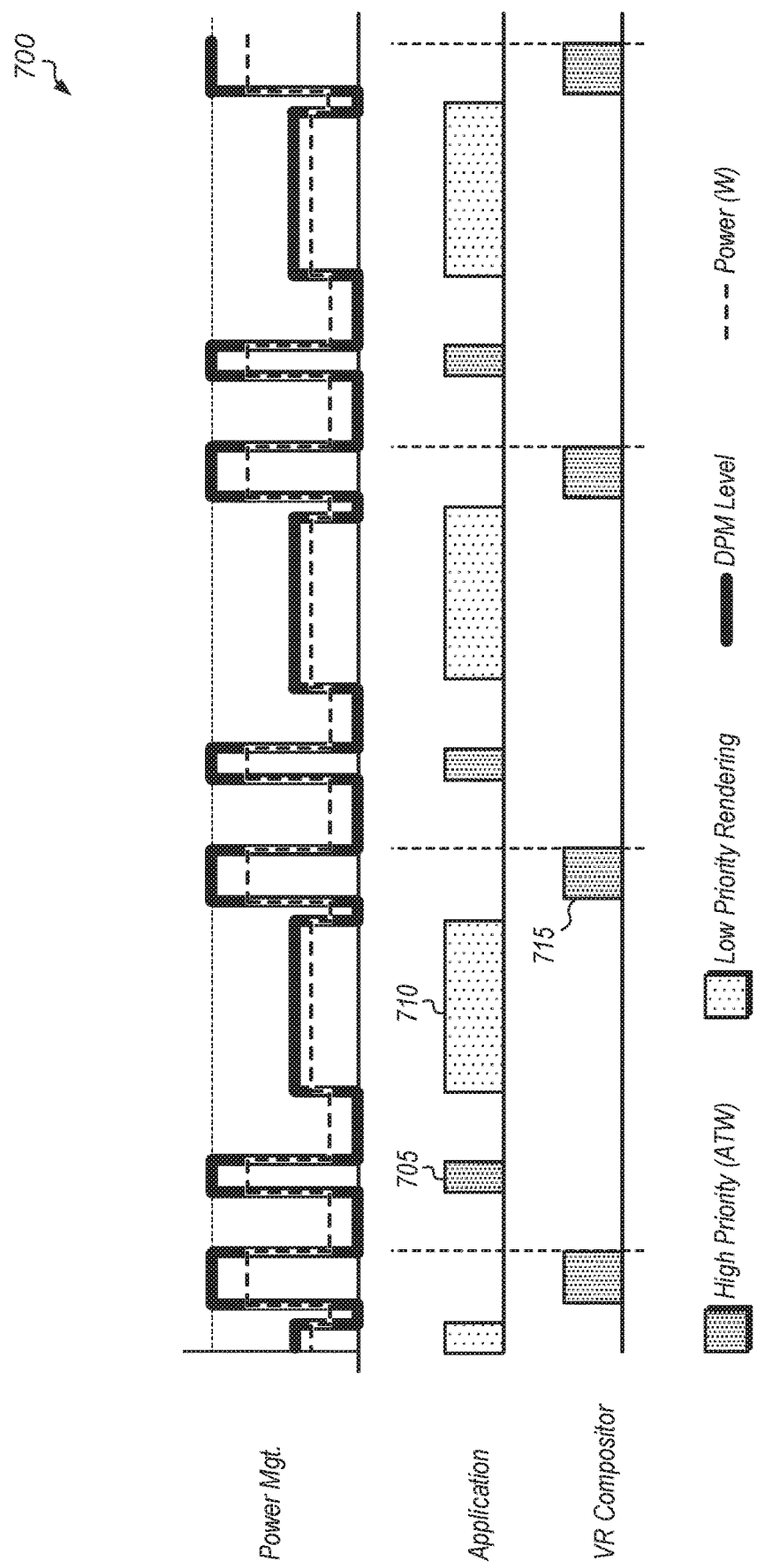
FIG. 7 illustrates a timing diagram of one embodiment of an implementation of fine-grain power management.

Referring now to FIG. 7, one embodiment of a timing diagram 700 of an implementation of fine-grain power management is shown. In one embodiment, an application has two separate rendering tasks, indicated by intervals 705 and 710, for each frame period. In other embodiments, a VR application has more than two rendering tasks per frame period, and the number of rendering tasks varies from frame period to frame period. Since interval 705 corresponds to a high priority rendering task, the power state of the GPU hardware is increased during interval 705. In between intervals 705 and 710 within the same frame period, the power state of the GPU hardware is reduced to the lowest possible power state. Then, with interval 710 corresponding to a low priority rendering task, the power state of the GPU hardware is set to a medium power state during interval 710.

In between intervals 710 and 715 within the same frame period, the power state of the GPU hardware is reduced to the lowest possible power state. Then, since interval 715 includes a high priority rendering task corresponding to the ATW, the power state of the GPU hardware is increased to the highest possible power state. For the next frame period, the GPU hardware is set to the lowest possible power state until the next rendering task is performed. This pattern of adjusting the GPU power states continues for the remainder of the frame periods shown in timing diagram 700. By using the fine-grain power management scheme shown in timing diagram 700, the VR system maintains adequate performance while reducing the likelihood of suffering a thermal event by reducing the power consumption of the GPU hardware when idle or when performing low priority rendering tasks.

Figure 8:
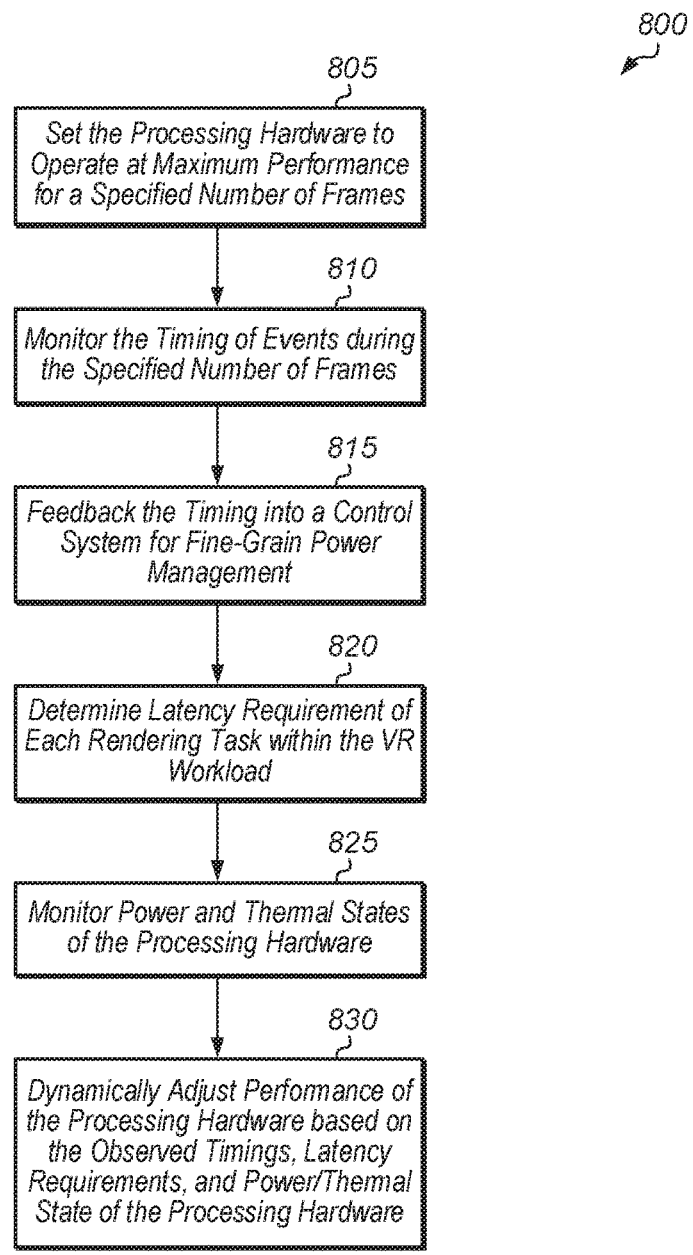
FIG. 8 is a generalized flow diagram illustrating one embodiment of a method for dynamically adjusting performance of VR processing hardware.

Turning now to FIG. 8, one embodiment of a method 800 for dynamically adjusting performance of VR processing hardware is shown. For purposes of discussion, the steps in this embodiment are shown in sequential order. It should be noted that in various embodiments of the method described below, one or more of the elements described are performed concurrently, in a loop, in a different order than shown, or are omitted entirely. Other additional elements are also performed as desired. Any of the various systems or apparatuses described herein are configured to implement method 800.

A VR system sets its processing hardware to operate at maximum or other fixed level performance for a specified number of frames (block 805). Operating at maximum performance corresponds to operating at the highest possible power state (e.g., highest possible supply voltage and highest possible clock frequency). In one embodiment, the processing hardware includes one or more GPUs. In other embodiments, the processing hardware includes other types of processing units. The software executing on the VR system includes a VR application, a VR compositor, and a GPU driver. The VR system monitors the timing of events during the specified number of frames (block 810). The events include the durations of various tasks being performed during the rendering of VR content. Next, the VR system will feedback the timing into a control system for fine-grain power management (block 815).

The system also determines the latency requirement of each rendering task within the VR workload (block 820). Additionally, the system monitors the power and thermal states of the processing hardware (block 825). Then, the system dynamically adjusts performance of the processing hardware based on the observed timings, latency requirements, and power/thermal state of the processing hardware (block 830). After block 830, method 800 ends. It is noted that method 800 can be invoked multiple times after the initial invocation has ended.

Figure 9:
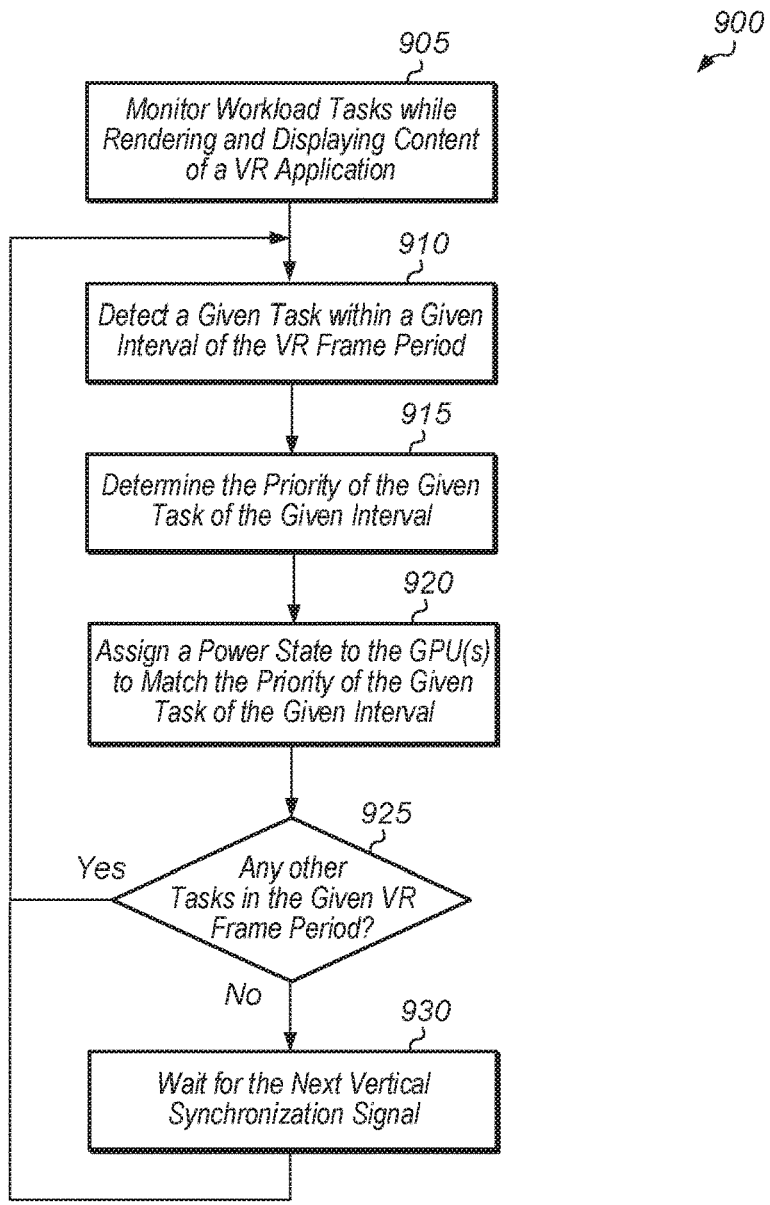
FIG. 9 is a generalized flow diagram illustrating one embodiment of a method for implementing fine-grain power management for a VR application.

Referring now to FIG. 9, one embodiment of a method 900 for implementing fine-grain power management for a VR application is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 900.

A VR compositor monitors workload tasks while rendering and displaying content of a VR application (block 905). Next, the VR compositor detects a given task within a given interval of the VR frame period (block 910). Next, the VR compositor determines the priority of the given task of the given interval (block 915). In one embodiment, the VR compositor receives, from the VR application, an indication which specifies the type and priority of the given task of the given interval.

Next, a GPU driver assigns a power state (e.g., power performance state (P-state)) to the GPU(s) to match the priority of the given task of the given interval (block 920). For example, if the given task has a high priority, then the GPU driver assigns a high power state to the GPU(s) during the given interval. Alternatively, if the given task has a low priority, then the GPU driver assigns a low power state to the GPU(s) during the given interval.

Then, the VR compositor determines if there any other tasks in the given VR frame period (conditional block 925). If there is another task in the given VR frame period (conditional block 925, "yes" leg), then method 900 returns to block 910. If there are no other tasks in the given VR frame period (conditional block 925, "no" leg), then the VR compositor waits for the next vertical synchronization signal (block 930). After block 930, method 900 returns to block 910. In another embodiment, method 900 can be repeated on each Nth frame as opposed to every frame as described in FIG. 9.

Figure 10:
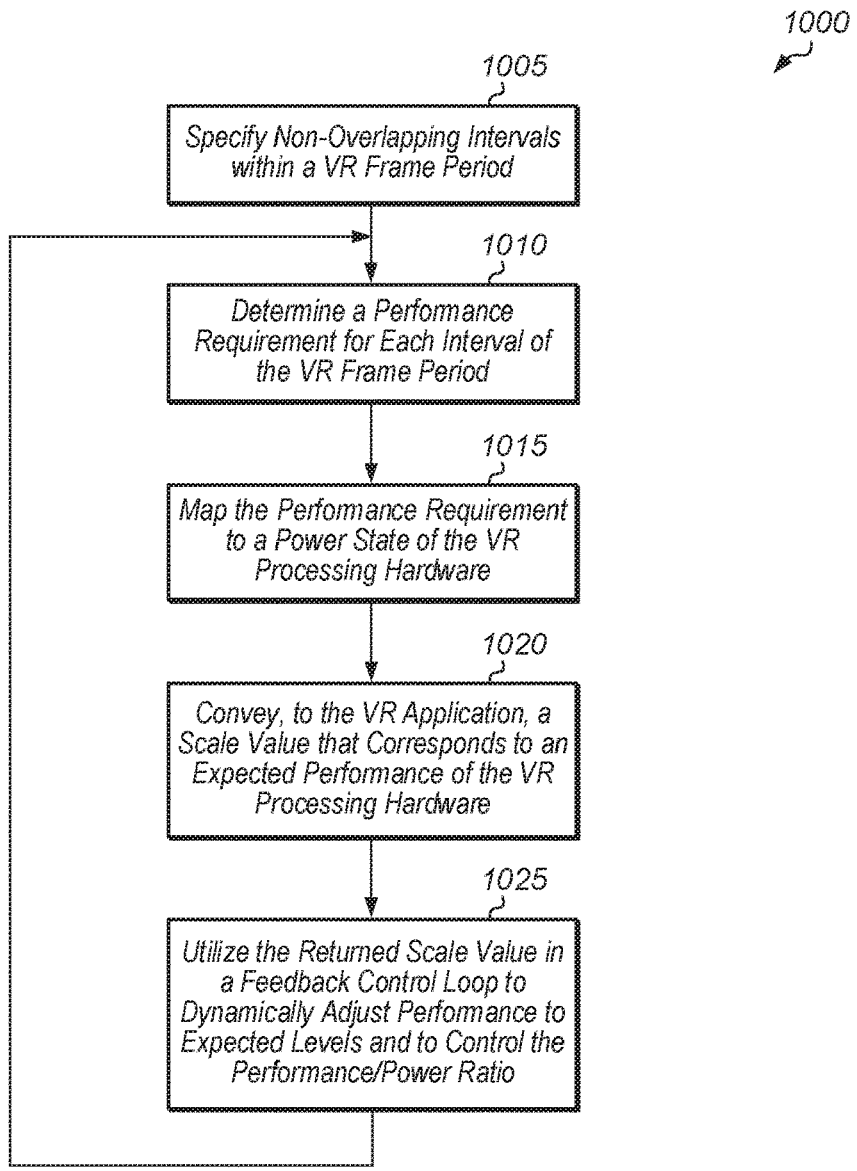
FIG. 10 is a generalized flow diagram illustrating one embodiment of a method for dynamically adjusting performance of VR processing hardware.

Turning now to FIG. 10, one embodiment of a method 1000 for dynamically adjusting performance of VR processing hardware is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1000.

A VR application specifies non-overlapping intervals within a VR frame period (block 1005). The intervals correspond to distinct tasks being performed by the VR processing hardware. In one embodiment, the VR processing hardware includes one or more GPUs. Next, the VR application determines a performance requirement for each interval of the VR frame period (block 1010). For example, intervals with a higher priority are assigned a higher performance requirement. In one embodiment, the performance requirements are specified using a linear scale of the GPU performance relative to the highest and lowest power states. In some cases, the performance scale is approximate, meaning that for an average GPU bound workload, a performance value of 0.5 is roughly in the middle between the maximum and minimum GPU performance.

Next, a GPU driver maps the performance requirement to a power state of the VR processing hardware (block 1015). Then, the GPU driver conveys, to the VR application, a scale value that corresponds to an expected performance of the VR processing hardware (block 1020). For example, in one embodiment, for a given interval, an application could request a performance factor of 0.4, but a factor of 0.55 is actually applied by the GPU driver. Next, the VR application utilizes the returned scale value in a feedback control loop to dynamically adjust performance to expected levels and to control the performance/power ratio (block 1025). After block 1025, method 1000 returns to block 1010. It is noted that in another embodiment, a VR application can provide some timing interval information for a portion of the tasks and a VR compositor could infer the timing interval information for the remainder of the tasks.

Figure 11:
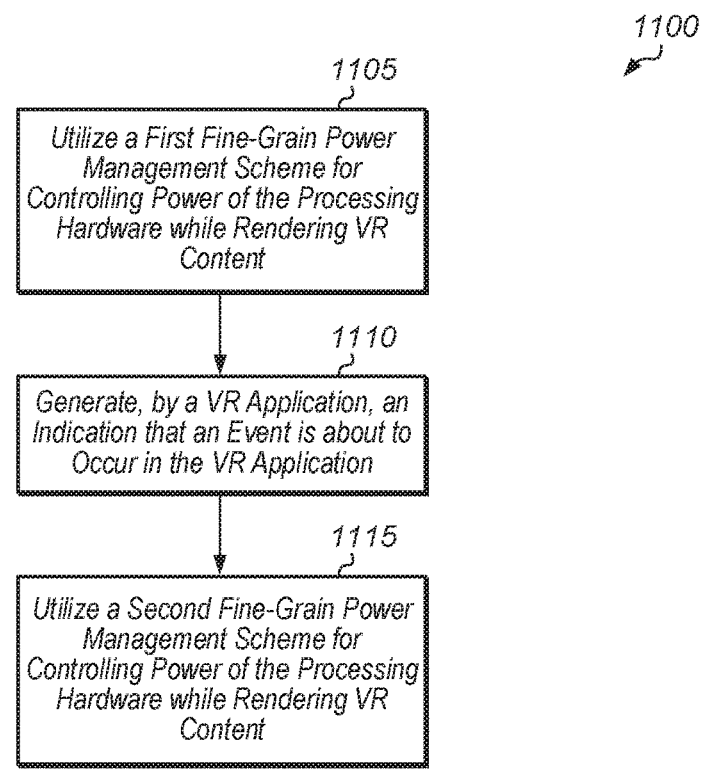
FIG. 11 is a generalized flow diagram illustrating one embodiment of a method for adjusting fine-grain power management in a VR environment.

Referring now to FIG. 11, one embodiment of a method 1100 for adjusting fine-grain power management in a VR environment is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1100.

A VR compositor utilizes a first fine-grain power management scheme for controlling power of the processing hardware while rendering VR content (block 1105). The VR compositor determines that the first fine-grain power management scheme is the optimal scheme for controlling power of processing hardware while rendering VR content. The first fine-grain power management scheme includes a separate power setting assigned to the processing hardware for each task of a plurality of tasks being performed during each frame period. Next, a VR application generates an indication that an event (i.e., a change in content) is about to occur in the VR application (block 1110). For example, the VR application determines that an explosion is about to occur in the game being rendered, and so the VR application generates an indication of this impending event and conveys the indication to the VR compositor. In other scenarios, the VR application determines that other types of events will occur which will cause in an increase or decrease in the difficulty of one or more rendering tasks.

In response to receiving the indication, the VR compositor utilizes a second fine-grain power management scheme for controlling power of the processing hardware while rendering VR content (block 1115). It is assumed for the purposes of this discussion that the second fine-grain power management scheme is different from the first fine-grain power management scheme. For example, at least a first rendering task is performed with a different power setting for the processing hardware in the second fine-grain power management scheme as compared to the first fine-grain power management scheme. After block 1115, method 1100 ends.

Figure 12:
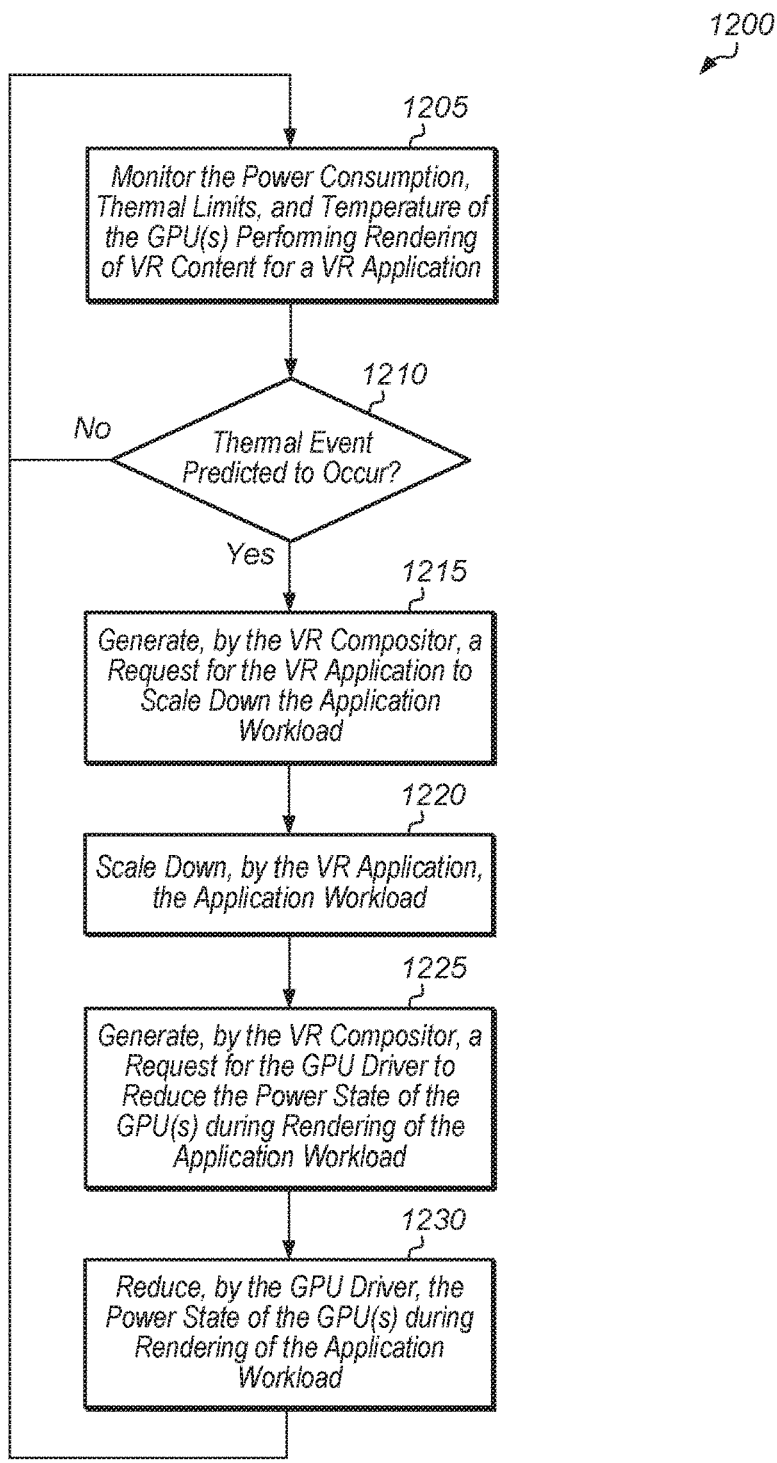
FIG. 12 is a generalized flow diagram illustrating one embodiment of a method for monitoring power consumption of GPU(s) during VR rendering.

Turning now to FIG. 12, one embodiment of a method 1200 for monitoring power consumption of GPU(s) during VR rendering is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1200.

A VR compositor monitors the power consumption, thermal limits, and temperature of the GPU(s) performing rendering of VR content for a VR application (block 1205). Next, the VR compositor predicts whether the GPU(s) are likely to experience a thermal event based on the monitored parameters (conditional block 1210). If a thermal event is not predicted to occur (conditional block 1210, "no" leg), then method 1200 returns to block 1205.

If a thermal event is predicted to occur (conditional block 1210, "yes" leg), then the VR compositor generates a request for the VR application to scale down the application workload (block 1215). Scaling down the application workload includes reducing rendered resolution, reducing the complexity of effects, and/or one or more other actions. Next, the VR application scales down the application workload as requested by the VR compositor (block 1220). Then, the VR compositor generates a request for the GPU driver to reduce the power states of the GPU(s) during rendering of the application workload (block 1225). Next, the GPU driver reduces the power state of the GPU(s) during rendering of the application workload as requested by the VR compositor (block 1230). After block 1230, method 1200 returns to block 1205.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    one or more processors configured to:
        execute an application, wherein the application specifies a priority of each rendering task of a plurality of rendering tasks for a given virtual reality (VR) frame;
    logic comprising circuitry configured to:
        utilize a scale value in a feedback control loop of the application to dynamically adjust a power performance state of the one or more processors;
        utilize a first power performance state for the one or more processors while performing a first rendering task in a first interval of a period of the given VR frame; and
        utilize a second power performance state for the one or more processors while performing a second rendering task in a second interval of the period of the given VR frame, wherein the second power state is different from the first power state.

2. The system as recited in claim 1, wherein the circuitry is configured to:
    determine a performance requirement for each interval within a period of the given VR frame based on a priority of a corresponding rendering task being performed during the interval;
    map the performance requirement to a power performance state of the one or more processors; and
    adjust the power performance state of the one or more processors based at least in part on the performance requirement.

3. The system as recited in claim 2, wherein the circuitry is configured to:
    monitor execution of the plurality of rendering tasks assigned to execute within the period of the given VR frame;
    receive, from the application, a priority of each rendering task of the plurality of rendering tasks; and
    adjust a power performance state to the one or more processors based at least in part on the priority of each rendering task.

4. The system as recited in claim 3, wherein the scale value corresponds to an expected performance of the one or more processors based on a mapping of power performance states to the scale value.

5. The system as recited in claim 1, wherein the circuitry is configured to:
    monitor an execution time of each rendering task of a plurality of rendering tasks for a specified number of frames;
    feedback the execution time of each rendering task into a control system for fine-grain power management;
    determine a latency requirement of each rendering task;
    monitor power performance and thermal states of the one or more processors; and
    dynamically adjust a power performance state of the one or more processors during a subsequent frame based on an execution time of each rendering task, latency requirement of each rendering task, power performance state of the one or more processors, and thermal state of the one or more processors during the specified number of frames.

6. The system as recited in claim 1, wherein the circuitry is configured to identify non-overlapping intervals within each rendered VR frame period, wherein each non-overlapping interval corresponds to a separate rendering task.

7. The system as recited in claim 1, wherein the circuitry is configured to:
    determine whether a thermal event is likely to occur; and
    increase the power performance state of the one or more processors for rendering of virtual reality content in a specified interval responsive to detecting an impending thermal event.

8. A method comprising:
    executing an application which specifies a priority of each rendering task of a plurality of rendering tasks for a given virtual reality (VR) frame;
    utilizing a scale value in a feedback control loop of the application to dynamically adjust a power performance state of the one or more processors;
    utilizing a first power performance state for the one or more processors while performing a first rendering task in a first interval of a period of the given VR frame; and
    utilizing a second power performance state for the one or more processors while performing a second rendering task in a second interval of the period of the given VR frame, wherein the second power state is different from the first power state.

9. The method as recited in claim 8, further comprising:
    determining a performance requirement for each interval within a period of the given VR frame based on a priority of a corresponding rendering task being performed during the interval;
    mapping the performance requirement to a power performance state of the one or more processors; and
    adjusting the power performance state of the one or more processors based at least in part on the performance requirement.

10. The method as recited in claim 9, further comprising:
    monitoring execution of the plurality of rendering tasks assigned to execute within the period of the given VR frame;
    receiving, from the application, a priority of each rendering task of the plurality of rendering tasks; and
    adjusting a power performance state to the one or more processors based at least in part on the priority of each rendering task.

11. The method as recited in claim 10, wherein the scale value corresponds to an expected performance of the one or more processors based on a mapping of power performance states to the scale value.

12. The method as recited in claim 8, further comprising:
    monitoring an execution time of each rendering task of a plurality of rendering tasks for a specified number of frames;
    feeding back the execution time of each rendering task into a control system for fine-grain power management;
    determining a latency requirement of each rendering task;
    monitoring power performance and thermal states of the one or more processors; and
    dynamically adjusting a power performance state of the one or more processors during a subsequent frame based on an execution time of each rendering task, latency requirement of each rendering task, power performance state of the one or more processors, and thermal state of the one or more processors during the specified number of frames.

13. The method as recited in claim 8, further comprising identifying non-overlapping intervals within each rendered VR frame period, wherein each non-overlapping interval corresponds to a separate rendering task.

14. The method as recited in claim 8, further comprising:
determining whether a thermal event is likely to occur; and
increasing the power performance state of the one or more processors for rendering of virtual reality content in a specified interval responsive to detecting an impending thermal event.

15. A non-transitory computer readable storage medium storing program instructions, wherein the program instructions are executable by a processor to:
execute an application which specifies a priority of each rendering task of a plurality of rendering tasks rendering a given virtual reality (VR) frame;
utilize a scale value in a feedback control loop of the application to dynamically adjust a power performance state of the one or more processors;
utilize a first power performance state for the one or more processors while performing a first rendering task in a first interval of a period of the given VR frame; and
utilize a second power performance state for the one or more processors while performing a second rendering task in a second interval of the period of the given VR frame, wherein the second power state is different from the first power state.

16. The non-transitory computer readable storage medium as recited in claim 15, wherein the program instructions are further executable by a processor to:
determine a performance requirement for each interval within a period of the given VR frame based on a priority of a corresponding rendering task being performed during the interval;
map the performance requirement to a power performance state of the one or more processors; and
adjust the power performance state of the one or more processors based at least in part on the performance requirement.

17. The non-transitory computer readable storage medium as recited in claim 16, wherein the program instructions are further executable by a processor to:
monitor execution of the plurality of rendering tasks assigned to execute within the period of the given VR frame;
receive a priority of each rendering task of the plurality of rendering tasks; and
adjust a power performance state to the one or more processors based at least in part on the priority of each rendering task.

18. The non-transitory computer readable storage medium as recited in claim 17, wherein the scale value corresponds to an expected performance of the one or more processors based on a mapping of power performance states to the scale value.

19. The non-transitory computer readable storage medium as recited in claim 15, wherein the program instructions are further executable by a processor to:
monitor an execution time of each rendering task of a plurality of rendering tasks for a specified number of frames;
feedback the execution time of each rendering task into a control system for fine-grain power management;
determine a latency requirement of each rendering task;
monitor power performance and thermal states of the one or more processors; and
dynamically adjust a power performance state of the one or more processors during a subsequent frame based on an execution time of each rendering task, latency requirement of each rendering task, power performance state of the one or more processors, and thermal state of the one or more processors during the specified number of frames.

20. The non-transitory computer readable storage medium as recited in claim 15, wherein the program instructions are further executable by a processor to identify non-overlapping intervals within each rendered VR frame period, wherein each non-overlapping interval corresponds to a separate rendering task.

* * * * *